United States Patent [19]

Ege

[11] 4,110,592
[45] Aug. 29, 1978

[54] METHOD OF SPLICING TAPE BY SOLDERING

[75] Inventor: Sigmund Ege, Oslo, Norway

[73] Assignee: Kløften & Kløften A/S, Oslo, Norway

[21] Appl. No.: 692,454

[22] Filed: Jun. 3, 1976

[51] Int. Cl.² .............................................. B23K 1/04
[52] U.S. Cl. .............................. 219/85 M; 219/85 H; 219/106; 228/249; 228/250
[58] Field of Search .............. 219/85 R, 85 A, 85 BA, 219/85 BM, 85 CA, 85 CM, 85 M, 85 H, 106, 118; 228/5.7, 246, 247, 249, 250

[56] References Cited

U.S. PATENT DOCUMENTS

| | | | |
|---|---|---|---|
| 1,357,080 | 10/1920 | Peck | 219/85 CA |
| 2,972,808 | 2/1961 | Litton | 228/250 X |
| 3,334,211 | 8/1967 | Wheeler et al. | 219/106 X |
| 3,602,682 | 8/1971 | Hoeffleur | 219/118 X |

*Primary Examiner*—E. P. Goldberg
*Attorney, Agent, or Firm*—Victor F. Volk

[57] ABSTRACT

Metallic tape is butt spliced, i.e. without overlapping the tape, by measuring a fine strip of silver solder into a gap between the cut edges of the lengths of tape being spliced in such a manner that the strip of solder extends over one of the lengths and under the other. The area being spliced is pressed between carbon electrodes and the silver solder is fused by the passage of resistance current.

10 Claims, 8 Drawing Figures

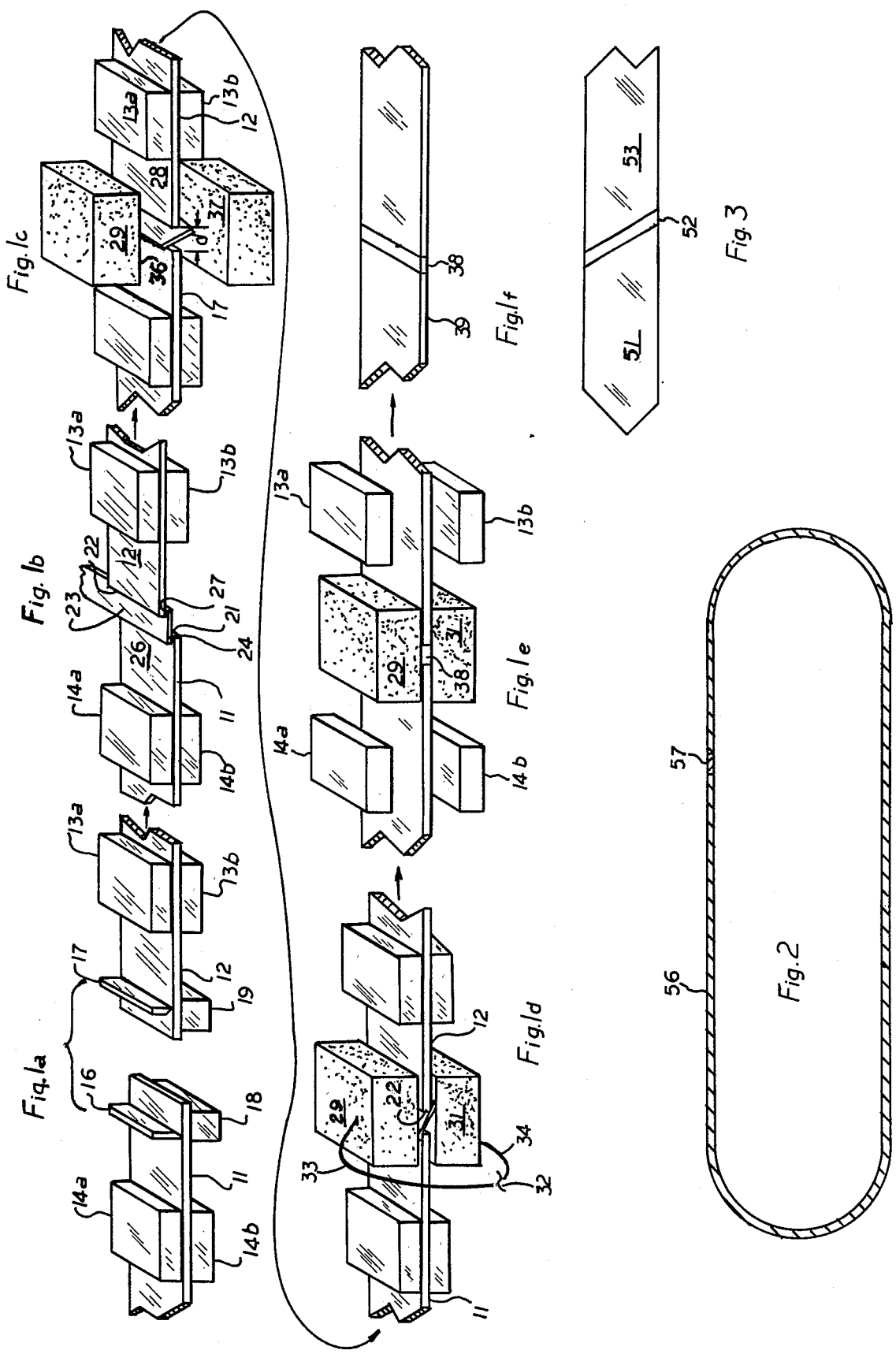

METHOD OF SPLICING TAPE BY SOLDERING

BACKGROUND OF THE INVENTION

Where metallic tape is used in some manufacturing operation the tape is customarily paid from a flat roll or from a spool and when the roll is exhausted the entire operation must be shut down until a new roll can be introduced and the leading end of a fresh tape spliced onto the trailing end of the tape in use. A typical operation requiring metallic tape of a type which is the subject of the present invention occurs in electric cable manufacture where a thin copper tape is continuously applied as electrical shielding over a cable core. In this application the tape is folded around the core during the extrusion of the cable jacket and any interruption of the tape supply will cause a shutdown of the entire extrusion process or a discontinuity in the cable.

Mechanical means have been commercially available for making overlapped soft-solder splices in copper cable tapes, but such splices have the disadvantage of a double thickness of tape plus the thickness of the solder layer at the area of overlap. This increased thickness, and the resulting tape stiffness, may prevent proper folding of the tape around the cable core and/or cause the tape to become jammed in the folding or extrusion apparatus. Prior to the present invention no commerically practical method had been known for making reliable butt splices in cable shielding tapes. As a consequence, cable manufacturers having the most advanced manufacturing equipment and development facilities have been forced to the expedient of paying one length of shielding tape after another without splicing the tapes together. They are then required to mark the points in the cable where tape discontinuities occur and to cut the cable at these points.

SUMMARY

I have discovered a method of butt splicing metallic tapes that can be accomplished so rapidly that, by accumulating some slack at the end of each roll, a new roll can be spliced to it without interrupting a continuous operation in which the tape is used. Fine tapes, which typically may have cross sectional areas of 0.0025 sq. in. (1.6 sq. m.m.) or less, have generally been believed by persons skilled in this art not to be commercially butt spliceable with butt splices sufficiently strong and reliable to be useful in cable manufacture.

In my novel method of butt splicing I position two lengths of metallic tape, such, for a preferred example, as copper tape, of substantially equal thickness, with their broad surfaces coplanar or in substantially parallel planes. These lengths may be discontinuous, as will be the case where a fresh roll of tape is spliced to the trailing end of an exhausted roll, but my method will also have application where the lengths being spliced occur at opposite ends of a continuous tape and the splicing is done to form a continuous loop.

I cut one of the lengths to form a first substantially straight edge of that length and I cut the other length to form a second straight edge of this other length, the second edge being substantially parallel to the first edge when the lengths are aligned. These edges may be angled obliquely to the length of the tapes, or perpendicular thereto. I advance at least one of the edges close to the other edge so as to leave a small gap in the lengthwise distance between the edges and I introduce a thin strip of silver solder through the gap between these edges, advantageously across the entire edge lengths. This strip has a width that substantially exceeds the thickness of the tape, and substantial portions of the width of the strip overlap one surface of one of the lengths and the opposite surface of the other length of tape. Thereafter I press the edges between substantially flat surfaces of two facing electrodes, which may advantageously be formed of carbon, thereby pressing the strip against one surface of one of the lengths and the opposite surface of the other length. I then pass a sufficient current between the electrodes and through the silver solder strip and lengths of tape to flow the silver solder to fill the gap and to fuse to the edges. Subsequently I cool the lengths of tape and the silver solder at the edges so as to butt splice the edges together.

Advantageously my method is practiced with the tapes horizontal, in which case the silver solder strip will extend over one of the lengths and under the other.

BRIEF DESCRIPTION OF THE DRAWING

FIGS. 1a–1f show schematic views of the steps in the method of my invention.

FIG. 2 shows a side sectional view of a splice in a continuous tape made by the method of my invention.

FIG. 3 shows a plan view of tapes having a splice made obliquely to the tape length.

DETAILED DESCRIPTION OF PREFERRED EMBODIMENT

Referring to FIG. 1a two copper tape lengths 11,12 to be spliced are held in parallel planes at different elevations by clamps 13a,13b and 14a,14b while knife blades 16,17, acting against retractable anvils 18,19, sever respective square edges 21,22 into the lengths 11,12 (FIG. 1b). One or both of the clamps 14a,14b or 13a,13b is then advanced to bring the edges 21,22 within a predetermined horizontal gap distance "d" (FIG. 1c) of each other even though they remain in separate planes (FIG. 1b). It will, of course, be understood that the relative distance between the clamps might be fixed within the scope of my invention. In that case, after cutting the edges, one or both clamps might merely be relaxed sufficiently to advance the tape through it, which might be done manually, to the desired gap spacing. A strip 23 of silver solder is introduced from a roll or other strip supply, not shown, horizontally between the planes of the lengths 11,12 and through the gap "d" so that a portion 24 of the strip 23 overlaps an upper surface 26 of the length 11 and a portion 27 of the strip 23 extends under the length 12.

My invention is particularly applicable to thin tapes and the following dimensions are exemplary of the various dimensions that will produce optimum results in the practice of my invention. It is recommended that the ratios of these dimensions be used as a guide for different thicknesses of tape. In the illustrated example the thickness of the tape is 4 mils (0.102 m.m.), and the solder strip, which has a composition of 15% silver, 80% copper and 5% phosphorus, melting point of 640° C., and flow point of 704° C., is 3 mils (0.076 m.m.) thick and 62 mils (1.6 m.m.) wide. The silver solder was supplied by Lucas-Milhaupt, Inc. of Cudahy, Wisc. under the trademark Sil-Fos, but my method is not limited to the use of this product. Other so-called hard or high-melting brazing and soldering alloys of known compositions are also applicable to my method.

The linear distance of a gap "d" between the cut edges, much exaggerated for legibility in the drawing, is 7 mils (0.18 m.m.). Thus the strip 23 overlaps the top of the length 11 and underlies the undersurface of the length 12 each to a distance of 22.5 mils (0.57 m.m.).

As shown in FIG. 1c the clamp 13a,13b is then lowered to position the length 12 in the same plane as the length 11. Where a portion 28 of the length 12 is long enough to provide sufficient flexibility to the tape, this lowering step may be omitted since, as shown in FIG. 1d, the edge 22 will be pressed down by an electrode 29 which, in cooperation with a facing electrode 31, presses the strip against both tape lengths, as shown. A source of current 32, supplying the electrodes 29,31 through leads 33,34 is then energized to pass sufficient current to fuse the solder of the strip 26 to the edges 21,22 and flow it to fill the gap "d". During the fusion step the tape lengths 11,12 are thermally expanded so that the gap "d" between the edges is somewhat reduced. The current required for rapid, reproducible splices in the example whose dimensions have been given above is 150 amperes. The voltage of the supply is 27 volts, but this will vary, in a calculable manner, with the resistance of the electrodes. Preferably these electrodes are carbon and have parallel flat facing surfaces 36,37 (FIG. 1c). Other means of heating the silver solder to cause it to flow into the entire space of the gap "d", which is an important accomplishment of my method, and fuse to the edges 21,22, such as preheating the surfaces 36,37 or applying intense radiant heat energy may also be used within the scope of my invention, but I prefer electrical resistance heating, as described, for its speed and ease of exact control.

When the silver solder has fused, the electrodes 29,31 which are under light spring pressure (not shown), will close to the position shown in FIG. 1e where they are held until the silver solder solidifies into a strong, electrically conductive splicing element 38, the width of which is exaggerated in the drawing. The lower limiting dimension for the width of the element 38 will be somewhat lower than the thickness of the strip 23 because of the aforementioned thermal expansion of the tape lengths. After cooling, a spliced tape, indicated generally by the numeral 39, may pay without hindrance into the manufacturing operations.

An important novel feature of the present invention resides in the width of the strip 23 being sufficient to extend across the gap "d" between the tape edges and over the flat surfaces of the tape lengths in combination with the insertion of the tape through the gap so that it extends over one surface of one of the lengths and the opposite surface of the other length. Surprisingly, and possibly due, in part, to the thermal expansion of the tapes at the moment of fusion, the strip positioning of my method causes a thorough wetting of the entirety of both of the surfaces of the edges 21,22. An important advantage of my method resides in its reliability, since splices must pass into operation without having an opportunity for quality testing.

Although, in my method so far illustrated, the edges 21,22 have been cut perpendicular to the centerline of the tape, oblique cuts can be used, resulting in the splice shown in FIG. 3 where a splicing element 52 is obliquely angled to the centerline of two tape lengths 51 and 53. This is simply accomplished by changing the positions of the blades 16,17 and anvils 18,19 to be angled obliquely to the tape centerline, and by paying the strip 23 at the same oblique angle between the tape edges.

In FIG. 2 my splice method has been used to form a loop of a tape 56 by means of a splice 57.

From the foregoing description it is apparent that the method of my invention can be practiced by manual operations although faster operation will be accomplished by the use of a suitable apparatus. Modification of commercial apparatus now in use for the practice of my novel method is within the skill of factory mechanics to whom my method has been taught as herein described.

The foregoing description has been exemplary rather than definitive of my invention for which an award of Letters Patent is desired as defined in the appended claims.

I claim:
1. The method of splicing comprising the steps of:
   A. cutting substantially straight first and second edges respectively in first and second lengths of metallic tape, said second edge being substantially parallel to said first edge, said lengths being aligned,
   B. positioning said first length and said second length of tape with their broad surfaces coplanar or in substantially parallel planes,
   C. advancing at least one of said edges close to the other of said edges with no portion of either of said lengths overlapping any portion of the other of said lengths so as to leave a small gap in the lengthwise distance between said edges,
   D. introducing a thin strip of silver solder through said gap between said edges, said strip having a width substantially exceeding the thickness of said tape, substantial portions of the width of said strip overlapping one surface of said first length and the opposite surface of said second length,
   E. pressing said edges between substantially flat surfaces of processing means thereby pressing said strip against one surface of said first length and the opposite surface of said second length,
   F. heating said strip sufficiently to cause silver solder to flowingly fill said gap and fuse to said edges.
   G. cooling said lengths and the silver solder at said edges so as to butt splice said lengths.
2. The method of claim 1 wherein said flat surfaces are surfaces of two facing electrodes and said heating step comprises passing electric current between said electrodes through said lengths of tape and said strip.
3. The method of claim 1 wherein said lengths are discontinuous prior to said splicing.
4. The method of claim 1 wherein said lengths occur at opposite ends of a continuous tape, said splicing forming a loop of said tape.
5. The method of claim 1 wherein said tape is copper.
6. The method of claim 1 wherein said edges are perpendicular to the length of said tape.
7. The method of claim 1 wherein said edges are angled obliquely to the length of said tape.
8. The method of claim 1 wherein said strip is introduced across the entire length of said edges.
9. The method of claim 1 wherein said lengths are horizontal and said strip is introduced to extend over one of said lengths and under the other of said lengths.
10. The method of claim 2 wherein said electrodes are carbon.

UNITED STATES PATENT AND TRADEMARK OFFICE
CERTIFICATE OF CORRECTION

PATENT NO. : 4110592
DATED : August 29, 1978
INVENTOR(S) : Sigmund Ege

It is certified that error appears in the above-identified patent and that said Letters Patent are hereby corrected as shown below:

Col. 4, line 59 for "processing" read --pressing--

*Signed and Sealed this*

*Twenty-seventh* Day of *March 1979*

[SEAL]

Attest:

RUTH C. MASON
*Attesting Officer*

DONALD W. BANNER
*Commissioner of Patents and Trademarks*